June 26, 1923.
R. V. BINGAY
1,459,817
SAFETY RELIEF DEVICE
Filed Oct. 27, 1919
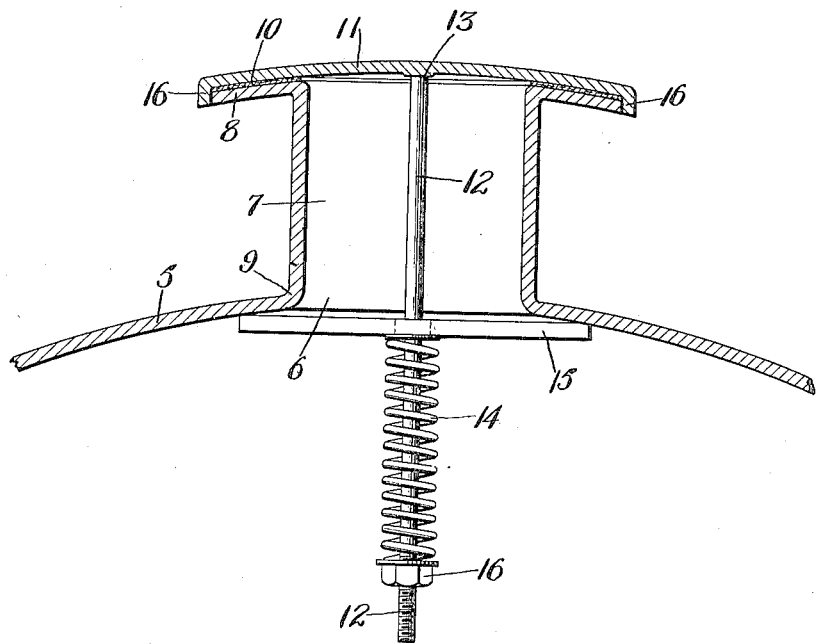
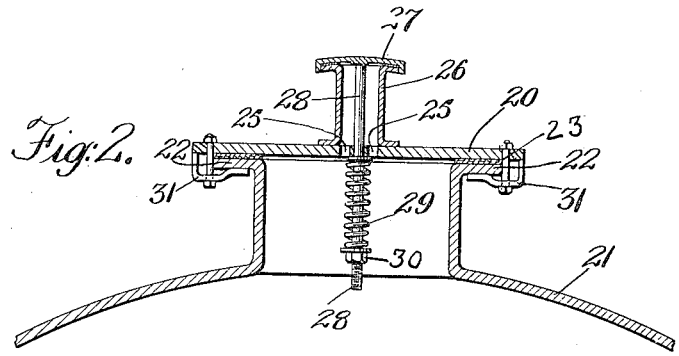
Robert V. Bingay Inventor
By his Attorneys
Edwards, Sager & Bower Patented June 26, 1923.

1,459,817

UNITED STATES PATENT OFFICE.

ROBERT V. BINGAY, OF PITTSBURGH, PENNSYLVANIA, ASSIGNOR TO PITTSBURGH TRANSFORMER COMPANY, A CORPORATION OF PENNSYLVANIA.

SAFETY RELIEF DEVICE.

Application filed October 27, 1919. Serial No. 333,787.

*To all whom it may concern:*

Be it known that I, ROBERT V. BINGAY, a citizen of the United States, residing at Pittsburgh, in the county of Allegheny and State of Pennsylvania, have invented certain new and useful Improvements in Safety Relief Devices, of which the following is a specification.

This invention relates to safety relief devices and particularly to such devices as applied to transformers wherein temporary excess pressures sometimes develop and are dangerous unless relieved. The object of the invention is to provide a relief means which will be simple in form and normally sealed air-tight, but readily releasing upon occurrence of an excess pressure.

A further object of the invention is to provide such a device in which the relief pressure will be adjustable and which will automatically close and reseal itself when the transformer pressure has been reduced to a safe amount.

In the embodiment of the invention shown in the drawings,

Fig. 1 is a vertical sectional view of a transformer top with a relief device of this invention, and Fig. 2 is a similar view illustrating a modification.

In Fig. 1 the invention is illustrated by an embodiment applied to the transformer top 5 having an opening 6 and a tubular outlet 7 flanged over at its outer end at 8. This tubular outlet 7 may be welded to the top at its point of juncture 9 or may be formed by flanging over the metal of the opening 6. The flange 8 is provided on its upper surface with a gasket 10 of suitable material to make an air-tight seal. The cover plate 11 fits the flange 8 and gasket 10 and is drawn down tightly thereon by rod 12 welded to the cover plate at 13 and tensioned by compression of spring 14 between spanner bar 15 and nut 16 of the rod 12.

The rod 12 passes through a recess in the bar 15 which is thereby held in its central position bridging the opening 6. The nut 16 is adjustable on rod 12 so that the cover plate 11 is held closed under a variable pressure and the relief point may be varied as desired. The cover plate 11 may be slightly crowned as shown and provided with the edge flange 16 to better shed rain and moisture and this construction also is advantageous in reversing the direction of the outflow in such manner as to utilize the reaction to maintain the cover plate widely open. This minimizes the resistance to the outflow and produces a quick and complete discharge of the excess pressure.

The relief device of this invention may be applied directly to the transformer top in case the same provides access to the nut 16 for adjustment or removal or the relief device may be mounted on a separate detachable plate 20 as shown in Fig. 2. In this latter construction the transformer top 21 is flanged as at 22 and provided with packing 23 and a top 20 having openings 25 therethrough to the tubular outlet 26 having cover plate 27, tension rod 28, spring 29 engaging below top 21, and nut 30 adjusting the compression of said spring. In this form the top 20 carrying the complete relief device in assembled condition is independently removable by loosening clamps 31 holding said cover to the outlet flanges 22.

The relief device of this invention is simple and inexpensive in construction and operation and easily adaptable to any construction of transformer. The cover plate 11 is normally held in tight engagement with the wide gasket 10 and the annular area of the cover in contact with this gasket is, therefore, protected from the transformer pressure which is confined to the center of the cover within this gasket. When, however, the pressure within the transformer is sufficient to lift the cover slightly, the upward pressure extends to the whole under-surface of the cover and this extended pressure and the reversing of the outflow quickly raise the cover and hold it open until the transformer pressure is reduced below a safe amount. The device therefore normally remains tight and is not unseated by small pressures, but quickly opens when the adjusted critical pressure is reached and remains open until this dangerous pressure has been sufficiently reduced.

I claim:—

1. A safety relief device for a transformer tank comprising an outlet member extending above an opening in the transformer tank top and having an outwardly extending circumferential flange thereon, a cover plate for said outlet having its edges extending over said flange to normally make sealing contact therewith and adapted to move upward therefrom to provide a free substantially radial opening and increase the area of the cover plate exposed to the pressure from the outlet, and spring means normally resiliently holding said cover plate closed with a pressure less than the opening force due to the pressure and reaction against the entire under surface of the cover plate when opened by pressure from within, so that the cover plate when lifted slightly will be held open by both the pressure and reaction of the escaping gases to quickly reduce the pressure within the transformer tank to a safe amount before closing.

2. A safety relief device for a transformer tank comprising an outlet member in free unobstructed communication with the interior of the tank and having outwardly extending flanges, a cover plate making sealing contact with said flanges and arched to turn the discharge through said outlet, a spanner member across said outlet engaging under the tank cover, and adjustable spring means carried by said spanner and resiliently holding said cover plate closed with a pressure less than the opening force due to the pressure and reaction against the entire under surface of the cover plate when opened by pressure from within, so that the cover plate when lifted slightly will be held open by both the pressure and reaction of the escaping gases to quickly reduce the pressure within the transformer tank to a safe amount before closing.

ROBERT V. BINGAY.